United States Patent [19]
Pall et al.

[11] 4,050,237
[45] Sept. 27, 1977

[54] DEMISTER ASSEMBLY FOR REMOVING LIQUIDS FROM GASES

[75] Inventors: David B. Pall, Roslyn Estates; Charles J. Roach, Brooklyn, both of N.Y.

[73] Assignee: Pall Corporation, Glen Cove, N.Y.

[21] Appl. No.: 633,062

[22] Filed: Nov. 18, 1975

Related U.S. Application Data

[63] Continuation of Ser. No. 450,032, March 11, 1974, abandoned.

[51] Int. Cl.² .......................... F02C 7/06; B01D 50/00
[52] U.S. Cl. .................................. 60/39.08; 55/486; 55/498; 55/521; 55/522
[58] Field of Search .................. 60/39.08; 184/6.11, 184/6.24; 415/112; 123/119 B; 55/486, 498, 276, 521, 522, 485, 482, 487, 488

[56] References Cited

U.S. PATENT DOCUMENTS

| | | | |
|---|---|---|---|
| 2,493,617 | 1/1950 | Chubbuck | 123/119 B |
| 2,613,498 | 10/1952 | Prendergast | 60/39.08 |
| 2,952,331 | 9/1960 | Beach | 55/485 X |
| 3,066,462 | 12/1962 | Yap et al. | 55/485 |
| 3,232,032 | 1/1966 | Pierce | 55/276 |
| 3,252,270 | 5/1966 | Pall et al. | 55/486 |
| 3,308,610 | 3/1967 | Springer et al. | 55/522 |
| 3,386,230 | 6/1968 | Riesberg et al. | 55/337 |
| 3,505,794 | 4/1970 | Nutter et al. | 55/521 |
| 3,716,436 | 2/1973 | Pall et al. | 55/521 X |
| 3,890,123 | 6/1975 | Kuga | 55/486 |
| 3,915,678 | 10/1975 | Felkner | 55/486 |

Primary Examiner—William L. Freeh
Assistant Examiner—Thomas I. Ross

[57] ABSTRACT

A demister assembly is provided for removing and reclaiming liquids from gases, and particularly engine lubricating oil aerosols from leakage air in gas turbine engines. When in series connection to an air vent line from a gas turbine engine, the demister strips out oil from the air before it is vented overboard while producing a moderate noise reduction and imposing only slightly higher back pressure on the system.

By increasing in number selected demister components, the noise reduction can be significantly increased with minimal increase in back pressure, combining a silencer function with the demister function.

6 Claims, 3 Drawing Figures

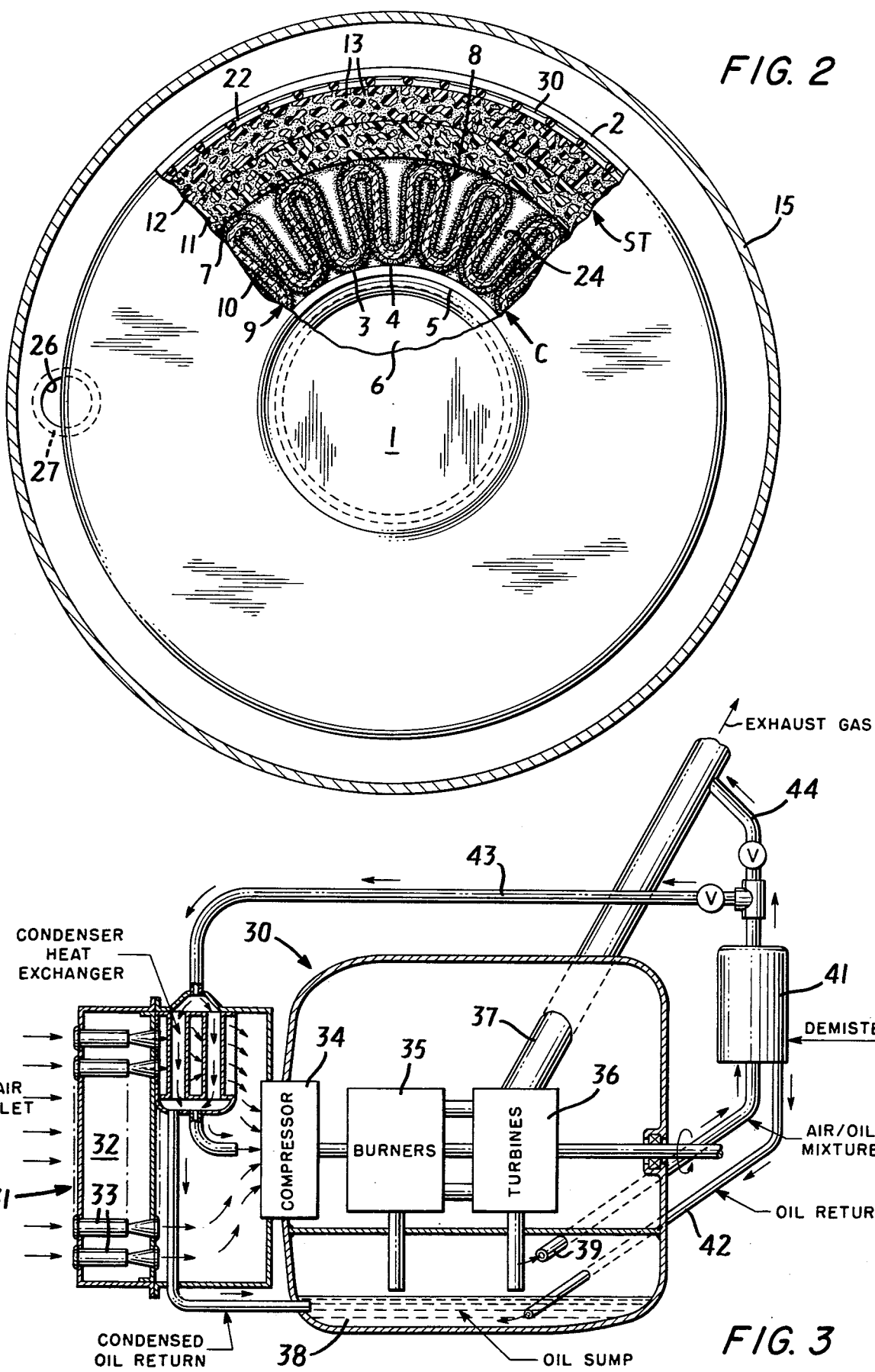

DEMISTER ASSEMBLY FOR REMOVING LIQUIDS FROM GASES

This is a continuation of application Ser. No. 450,032 filed Mar. 11, 1974, now abandoned.

Turbo-jet turbo-fan jet, bypass jet and turboshaft engines are used to power aircraft, and turboshaft engines and are used in vehicular and stationary applications. These types of engines are generically referred to as gas turbine engines, and include a compressor, a combustor and turbine sections. In order to prevent air leakage from rotating surfaces of the engine to the oil sump, some type of air seal is employed, usually a lip type and/or a labyrinth seal. The seal is externally pressurized by turbine bleed air and since all seals leak some air, the oil sump must be vented to limit the pressure rise. The air, which causes foaming and frothing when intermixed with oil through the gearing, is vented to the atmosphere, with oil vapor and aerosols of entrained oil droplets.

Such oil droplets may be deposited on the ground, and if they are, can pose a serious problem in the vicinity of airfields, where there is heavy traffic, and also along highways traversed by vehicles equipped with gas turbine engines, or in the vicinity of stationary gas turbine equipment. The resulting oil deposits gather dust and other particles of material from the air, and beside being difficult to remove, such deposits may pose safety and ecological hazards if they accumulate in the atmosphere or on airport runways, highway surfaces, and interior and exterior building surfaces. With the increased use of gas turbine engines, and the present emphasis on avoiding pollution of the atmosphere, it has become imperative to design a system which is capable of efficiently and more or less completely removing such entrained oil, whether entrained as an aerosol, or as larger oil droplets, while imposing a low system back pressure.

The amount of oil lost in this manner has a substantial economic impact on cost of operating the turbine; furthermore, frequent monitoring of oil levels and frequent refilling of oil sumps is very undesirable.

Normal practice is to vent the sump to the engine exhaust; this contributes significantly to pollution of the atmosphere.

Although it is known that the exhaust gases from gas turbine engines are responsible for carrying oil to the atmosphere, it has been impractical heretofore to strip the oil before it leaves the engine, because relative to the volume and velocity of flow, the amount of oil is very small. For example, conventional methods of spraying the vapors with water or of condensing the oil and derivative vapors in the exhaust gases, and then demisting the aerosols, are impractical, because they cannot cope with the volumes and flows of gases involved, in order to remove the very small amounts of oil present.

Gas turbine lubricating oils vary considerably with respect to oil operating temperatures, and various lubricants are used. When the oil temperatures are comparatively low and where low vapor pressure lubricants are used, the amount of vapor entrained in the air effluent from the sump is negligibly small. In turbines in which the temperatures are high, or in which high vapor pressure oils are used, oil carryover in vapor form can be significant. In such installations, a heat exchanger in which the cooling agent can be ambient air, can be used to reduce the effluent air temperature such that nearly all the oil vapor condenses to a mist or smoke, consisting of fine droplets, usually in the range 0.1 to 1 micron in diameter and predominantly 0.2 to 0.5 micron in diameter. Such a mist is very difficult to condense, and would for example, pass freely through any type of centrifugal or impact separator.

In accordance with the invention, a demister assembly is provided which is capable of removing, and optionally also of reclaiming, liquids entrained in gases, and especially of removing substantially all of the oil entrained as droplets in gases such as air with a low back pressure restriction, usually substantially less than one-half pound per square inch.

The demister assembly of the invention is placed not in the exhaust gas line of the engine but in the oil sump vent line from the lubricant supply reservoir. The demisted oil is reclaimed by providing a return drain line to the oil sump, thus providing a significant saving in oil consumption.

The demister assembly comprises a first stage coalescer, in which the entrained liquid droplets are coalesced into droplets sufficiently large to be affected by gravity, and in which a proportion of the thus condensed oil drops to the bottom of the coalescer, and a second stage coalescer, in which most of the remaining portion of the partially condensed droplets are further coalesced and drain to the bottom of the coalescer element.

The liquid collected at the demister is drained off, and in the case of lubricating oil may for example be returned to the oil sump. The gas from the demister although freed from oil droplets may contain oil vapor, and can be recycled to the compressor inlet of the engine, so that the oil vapor can also be consumed, before the gas is vented to the atmosphere as exhaust.

The demister of the invention is thus particularly applicable to a gas turbine engine, where it can be placed in the gas vent line from the oil sump. All gas leaving the sump consequently is compelled to pass through the demister of the invention. This ensures that oil droplets entrained in such gas are removed. The gas thus stripped of liquid oil but which may contain oil vapor is recycled to the compressor and the combustor. The result is that all gas flow which may possibly contain liquid oil droplets is passed through the demister, and oil vapor remaining therein is burned, so that oil-free exhaust gas passing from the compressor, burner, and turbine, is vented. Thus, substantially no gases capable of depositing oil can enter the atmosphere.

As an optional adjunct, the demister assembly of the invention can include additional elements to increase the sound-attenuating qualities. To obtain the silencer function in addition to the demister function, additional coalescing and stripper layers are added, which are capable also of sound attenuation, in addition to their coalescing and/or stripping function. When the gas is caused to pass through such sound absorption or sound attenuating material, the noise level is also reduced.

The coalescer in accordance to the invention is a nonwoven fibrous mat of relatively low density, and a relatively high porosity; porosity being defined as the percentage of voids. In this respect, the coalescer of the invention differs from coalescers used in liquid-to-liquid coalescence. As noted in U.S. Pat. No. 3,268,442, issued Aug. 23, 1966 to Pall, Krakauer, Seibert, Verrando and Keedwell, liquids suspended in liquids in which they are wholly or partially immiscible are removed by coalescing the droplets by forcing them through a small passage whose diameter is substantially less than the diameter of the suspended droplets. The passage can be of any configuration, for example, a single straight-through conduit, or a tortuous many-forked passage formed by the interconnected interstices in a mass of fibres. The configuration and length of the passage are not important, but the diameter relative to the diameter of the droplets is critical. Preferably, the passage is less than ⅔ down to about 1/10 the diameter of the smallest droplets suspended in the fluid being treated, and in any event less than 4/5 the average diameter of the suspended droplets. The passage can have a greater diameter over part of its length provided it at some point has such a minimum diameter. Preferably, the minimum diameter of the passage is at the entrance thereto, or adjacent the entrance. Such a coalescer when in the form of a nonwoven mat has a high density and a relatively low porosity.

In contrast, when coalescing liquid droplets entrained in a gas, the diameter of the passages can be considerably greater than the diameter of the droplets. The coalescence appears to result not from droplets squeezing through the passage but from the large surface area of the fibers, and the multiple changes in direction which the gas must make in flowing through the mat. The gas dashes the larger diameter droplets against the fibers by inertia, and they subsequently cling to the fibers. The smaller diameter particles randomly move by Brownian motion and over a large surface area have a statistically greater opportunity to contact a surface and cling to it; in addition, they collide with each other and coalesce to form larger droplets which are removed by inertia. Thus, the diameter of the passage is much less important than the surface of the fibers and a low density nonwoven mat of high porosity, (i.e. high percentage of voids, or high voids volume) and high surface area may indeed offer more opportunities for collision and coalescence of oil droplets than a low porosity structure with smaller openings, but with less surface area.

Any fibrous material inert to oil can be used in the nonwoven fibrous mat. Suitable fibrous materials include glass, quartz, ceramic, titanium dioxide, alumina, polyvinyl chloride, polyethylene, polypropylene, polyacrylonitrile, polyester, polyvinylidene chloride, regenerated cellulose, asbestos, cellulose acetate, resin-impregnated cotton, and polytetrafluoroethylene.

The fibers are sufficiently long so that they are capable of forming a coherent nonwoven mat. Neither their length nor the diameter is critical, but for efficient coalescing action it is important that the nonwoven mat offer a high surface area and density and for this purpose fine fibers are better than coarse fibers. Ordinarily, fiber diameters are within the range of from about 0.5 to about 5 microns.

The density of the nonwoven mat is controlled by confining the mat between rigid facing sheets. The rigidity of the sheets must be adequate to retain the nonwoven mat under the differential gas pressures that may be encountered across the layer without appreciable distortion or rupture. The density of the layer should in general be within the range from about 0.05 to about 0.5 g/cc. and preferably from about 0.2 to about 0.4 g/cc. As the facing sheets, sintered metal particle sheets; woven plastic or metal wire mesh, rolled and compressed and also sinter-bonded, if desired; perforate metal and plastic sheets; and resin-impregnated foraminous fibrous sheets can be used.

Since the fibrous coalescer layer is confined between facing sheets, it is not necessary that the fibers of the layer be bonded together. In fact, in a long fibered medium, if no binder is present, the porosity of the layer may be greater, and consequently, the pressure drop across the layer is less. It is desirable in order to maintain a high efficiency of separation of the entrained oil droplets to hold the pressure drop across the coalescer layer to as low a value as possible.

However, if short fibers are used improved fiber retention and reduced compressibility can be obtained by bonding the fibers with a synthetic resin. Phenol-formaldehyde resins, urea-formaldehyde resins, melamine-formaldehyde resins, epoxy resins and others are quite satisfactory bonding agents. The bonding technique is conventional, and need not be further described, except, of course, to note that the amount of resin is less than will reduce unduly the porosity of the mat. Just enough resin should be used to coat the fibers and ensure bonding at their points of contact. The amount is readily ascertained by simple calculation of the surface area of single fibers of any given diameter and length. From 3 to 50% resin by weight is usually adequate for 0.1 to 2 micron diameter fibers.

A preferred method of making mats of the type which can be employed as coalescers in the invention is to lay down a slurry of the fibers suspended in water of controlled pH on a cloth supported on the mesh of a Fourdrinier or paper making machine. A vacuum can be applied to condense the fibers to a mat on a cloth backing, which is then removed from the mesh screen support. The fibers can be similarly deposited from a suspension in air.

The stripper is of a porous sheet material which is coarser than the primary coalescer, but which is of a pore size such that the coalesced oil droplets are incapable of passing through the pores or interstices thereof, while the gas passes through freely. As the stripper, sheet a porous open-cell polyurethane foam can be used, having a porosity within the range from about 50 to about 150 pores per square inch, and having an average pore diameter within the range from about 0.005 to about 0.02 inch, and a voids volume preferably in excess of 80%. Any other material, for example a coarse glass fiber mat, or a mat of synthetic or natural organic fibers, may be used as a stripper, provided its pore size and voids volume is in a similar range.

Most of the oil mist incident on the primary coalescer is condensed to larger droplets, which flow by gravity to the bottom of the coalescer, and thence into the sump; however, a small proportion, usually between about 2 and about 15%, is instead entrained in the air leaving the coalescer, in the form of relatively large (e.g. 0.2 inch diameter or larger) droplets. These collect on the stripper. If the stripper is placed at an angle to the horizontal, the coalesced oil runs down the stripper by gravity, to collect at the base, drains off, and returns to the oil reservoir or sump.

The polyurethane foam can be made of any polyurethane resin which is not deteriorated by contact with the oil. Any polymer of a diisocyanate and a glycol can be used, including aliphatic diisocyanates and aliphatic glycols, aromatic diisocyanates and aliphatic glycols, aliphatic diisocyanates and aromatic glycols, aromatic diisocyanates and aromatic glycols, cycloaliphatic diisocyanates and aliphatic glycols, aliphatic diisocyanates and cycloaliphatic glycols, and any mixtures thereof, in any desired proportions.

It is frequently convenient to arrange the coalescer and stripper elements concentrically, each being in the form of a cylinder or other closed configuration, one within the other. To provide for a greater surface area within a confined space, the coalescer element can be folded in an undulating or corrugated configuration. The coalescer can be the outer of two elements, in such a concentric arrangement, flow being from outside in, with the gas and oil being collected at the center, and the oil being collected from the surface stripper element, draining by gravity down and the air discharge up. However, it is usually preferable to use the reverse arrangement, with flow from inside to out, as the velocity of the air leaving the stripper is lower, leading to a lower tendency to entrain droplets from the stripper. If the demister assembly is to include increased silencer capability, in order to obtain greater surface area and volume in the silencer assembly, for greater sound attenuation, it may be desirable to arrange the coalescer and stripper elements so that the coalescer element is the innermost and the stripper element the outermost. In this event, flow is from the inside out, through the demister assembly.

A concentric arrangement is not essential, however, although it is convenient for many uses. The coalescer and stripper elements can also be arranged as flat or corrugated sheets, with flow proceeding from one side to the other of the composite, which is arranged in-line.

Increased sound attenuation is obtained by including additional layers of the coalescer and stripper components in the demister assembly. These layers can be interposed before or after the coalescer unit, before or after the stripper unit, or coincident with the coalescer and stripper material, providing an increment of sound attenuation with each stage of additional coalescer and stripper material. It will be appreciated, of course, that the materials composing the coalescer and the stripper are capable of incremental sound absorption or sound attenuation. In many cases, they are, however, not capable of providing sufficient sound attenuation, and additional layers are necessary for the function, even though they may not be required for the coalescing or stripping function. The coalescing element additions increase the oil separating efficiency. While it may be difficult in the complete combination to assign exclusively a sound absorbing or coalescing and sound absorbing or stripping function to any given layer, where it is capable of serving both functions, it may be assumed that a given layer is present primarily for sound absorption or attenuation purposes where it is not required for coalescene or stripping, the device functioning in this respect even in the absence of such a layer.

As the sound absorbing or attenuating material, there can be used, paper porous foam material such as polyurethane foam, or nonwoven fibrous mats, such as glass fiber mats. As many layers as may be required can be added for this purpose. If the layers are of sufficient porosity, so that pressure drop is kept to a minimum, there is no upper limit upon the number of such layers which can be present.

The density of the sound attenuating or sound absorbing layers is not critical, but in general the greater the density, the better the sound attenuation, and the higher the coalescing efficiency, presumably because a larger surface area of material may then be confined within a given volume, sound attenuation being primarily a function of surface area, along with coalescing efficiency, although volume is also of significance.

While porosity is not critical, it will be appreciated that the porosity of a sound attenuating or absorbing layer downstream of the stripper element can be greater than that of a similar layer upstream of the coalescer, because the air downstream of the stripper is free from oil.

The density of the coalescer sound attenuating layers can be within the range from about 0.1 to about 0.5 g/cc. and the fiber diameter should be within the range from about 1 to about 10 microns, and the porosity of the stripper sound attenuating layers can be within the range from about 50 to about 150 pores per inch, and having an average density within the range from about 2 to about 12 g/cc.

Preferred embodiments of the invention are shown in the drawings, in which:

FIG. 2 is a cross-sectional view taken along the line 2—2 with partial interior section of the demister assembly of FIG. 1.

FIG. 3 is a diagrammatic view of a gas turbine engine system in which a demister assembly of the invention is interposed in the air vent line from the oil sump, for removal of oil entrained in such air.

Figure 1:
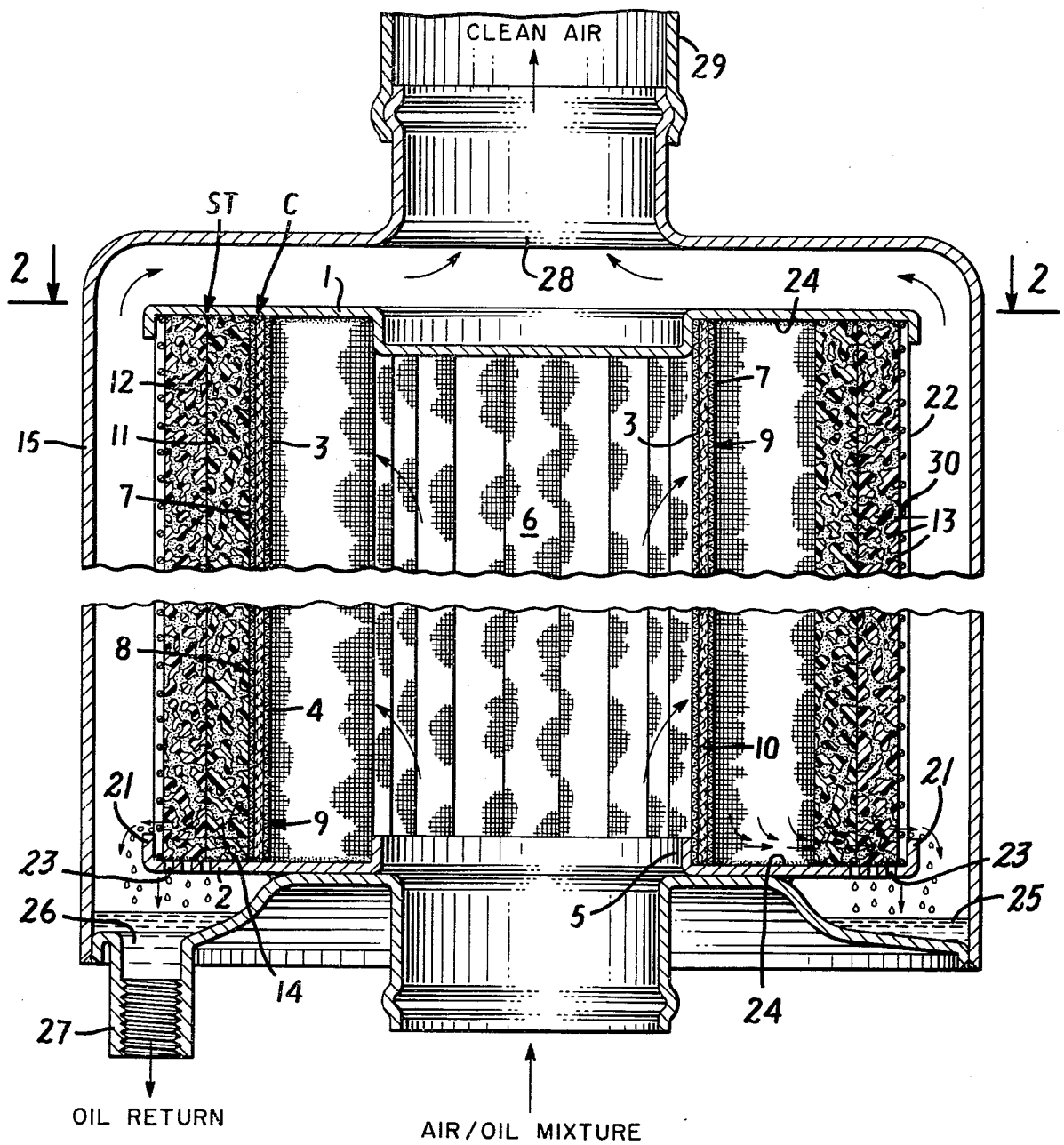
FIG. 1 is a longitudinal section through a demister assembly in accordance with the invention, designed for use with a gas turbine engine.

The demister and silencer assembly shown in FIGS. 1 and 2 is in cylinder form, within a housing 15, with the coaleser C and stripper ST components being arranged concentrically within a housing 15, the several concentric cylinders thereof confined between and bonded to end caps 1, 2. The layers are supported upon an inner perforated convoluted metal core 3, such as aluminum mesh sheet formed in a cylinder and having a plurality of relatively large apertures 4. The end cap 1 is blind, but the end cap 2 has a central aperture 5, serving as an inlet for oil-laden air into the central space 6 of the assembly, within the metal core 3.

The coalescer C is innermost, supported upon the core 3, and confined under compression between the core 3 and outer sheath 7. Both core 3 and sheath 7 are 8 × 14 square weave wire mesh screens made of aluminum wire, and having pore openings 0.009 inch in diameter, formed in a corrugated or undulating configuration. The coalescer material is a nonwoven fibrous mat 9 of glass fibers 10 approximately 0.00011 inch in diameter. The mat 9 is approximately ⅛ inch thick, in a single wrap between screens 3, 7, and has a density of approximately 1.5 lbs/cubic foot.

The stripper ST comprises two wraps of ⅛ inch thick layers of foamed polyurethane sheet 11, 12 having a porosity of 100 pores per square inch, and a voids volume in excess of 90%. Since each layer is approximately ⅛ inch thick, the total stripper consequently is ¼ inch thick. The polyurethane foam is in close juxtaposition to the outer sheath 7 of the coalescer C in order to obtain as compact an assembly as possible.

The assembly is protected by an outer sleeve of perforated metal 22, and a sleeve of open polypropylene extruded mesh 30 is interposed to permit free flow of air from the outer surface of the urethane foam to the holes of the perforated sleeve.

Each of the concentric cylindrical layers is bonded to the end caps 1, 2 at each end by the potting compound 24 in a leak-tight seal, thus ensuring that all flow entering the center 6 of the assembly through the inlet 5 of end cap 2 must pass through the several layers, in order to emerge through the outermost layer 22.

In operation, oil-laden air enters the assembly through the inlet 5 of end cap 2. It then proceeds through the core screen 3, thus entering the coalescer C, and passes through mat 9. In the course of passing through the coalescer mat 9, the entrained oil droplets are coalesced to form larger droplets, which grow in size until the balls of the influent oil settle to the bottom of the element by gravity. A small proportion of the oil is entrained as relatively coarse drops. Because of their relatively large size, these droplets are collected within the polyurethane foam, coalescing into still larger drops, which flow down by gravity to the bottom of the element, and thence flow over the lip 21 and through the ports 23 in the end cap 2 into the oil sump 25 at the base of the housing.

The housing 15 is provided with an oil outlet 26 which leads to the oil line 27, so that the oil collecting in the annular space 8 and oil sump 25 can be withdrawn through the outlet 26 via the oil line 27.

The air passes through the polyurethane foam layers 11, 12, now substantially free from oil droplets, but containing oil in vapor foam. This air then escapes through the outer sleeves 21 and 30, and then through outlet 28 of the housing, whence it may be conducted via the airline 29 to the engine intake, so that the oil vapor can be burned. For example, in a gas turbine engine (not shown) the air can be fed to the compressor, and then to the burner.

It will be appreciated that the end caps 1, 2 can be provided with any required fittings, so that they can be inserted in the air line leading from the oil sump of an engine. Such line connections are known, and form no part of the instant invention.

In addition to use in this manner, the demister assembly of the invention can also be used to remove oil mist from air exhausted from air cylinders. Exhaust air from air cylinders normally carries off a mist of lubricating oil, as well as a considerable amount of noise. The oil mist can be removed, and the noise level reduced by 30 dbA or more, using the demister of the invention.

It will of course be appreciated that a demister assembly with additional silencer components can easily be obtained by conversion of the device shown in FIGS. 1 and 2. All that need be done is introduce additional sound attenuating layers, such as nylon paper layers, another glass fiber mat, a paper layer, additional layers of polyurethane sheet, and a fabric layer.

The device is also useful with mist type lubricating systems, in which finely divided air-borne oil is carried to the bearings for lubrication. The effluent air from this lubricating system can be cleansed of oil mist, prior to being vented to the atmosphere, without danger of pollution. The collected oil can be returned to the mist generator for reuse.

The demister device can be built using materials not susceptible to attack by corrosive fluids, and can then also be used to remove corrosive acid droplets entrained in air, such as the hydrogen chloride mists obtained in chlorine manufacture, the sulfuric acid mists encountered in sulfuric acid manufacture, and the like.

The demister is particularly useful in gas turbine engines, where its low operating differential pressure permits it to be placed in close proximity to the engine.

The gas turbine engine shown diagrammatically in FIG. 3 employs a demister assembly in accordance with the invention in the air line leading from the oil sump. The source of this air is engine bleed air which leaks through the oil seals, and which picks up oil mist and vapor as it passes through the sump. By interposing the demister of this invention in the air line from the oil sump, the oil mist can be removed from the air.

The demister removes 90 to 99.99% of the oil present in the liquid form, and the remainer, together with any oil present as vapor, can be delivered to the engine intake, where the remaining oil is burned. It may alternatively be vented to the atmosphere. If the latter alternative is elected, it may be desirable to cool the air prior to reaching the demister, to reduce its content of oil vapor, if hot air containing oil vapor is delivered to atmosphere, the vapor condenses to a dense smoke on cooling.

The gas turbine engine 30 shown has an air inlet 31 provided with an array 32 of vortex separators 33 serving as an inlet air cleaners. The air then passes through the compressor 34 to the burners 35 and expands through the turbine 36, whence the exhaust gases pass to the exhaust gas outlet 37.

The engine includes an oil sump 38 serving as the source of lubricant such as lubricating oil which is fed under pressure to the moving parts of the engine, including the compressor bearings (not shown). Provision must be made to vent the air which leaks through the main bearing seals, and this is accomplished by the air vent line 39 leading from the sump. In this air vent line is interposed, in series, a demister 41 in accordance with the invention, which removes the liquid oil from this air, although not the oil vapor. The liquid oil thus removed is collected, and returned via line 42 to the oil sump 38.

It is necessary that the vertical elevation of the base of the demister relative to that of the surface of the fluid in the sump be such that a bead of oil of this height exceeds the differential pressure developed across the demister. If, for example, the differential pressure across the demister under the worst conditions of operation (saturated with oil) is 0.5 psi, and the density of the oil is 0.85 g/ml, then the minimum elevation must be 16 inches. In many installations, it is inconvenient, expensive, or impossible to provide higher elevations than 16 to 24 inches, whence the importance of low pressure drop through the demisters.

The line 43 carries the air containing oil vapor from the demister 41 to the compressor 34 of the engine, whence it is fed to the burner 35, so that the oil vapor is burned. The result is that this source of oil escaping to the atmosphere is effectively closed off, and nearly all the oil in such air is recovered for reuse, either as lubricating oil or as fuel. However, if desired, an air exhaust vent line 44 can be provided in lieu of line 43, or in addition (as shown).

If desired, a heat exchanger can be interposed (as shown) in the return line 43 to exchange heat with influent air from the air cleaner array 32, and cool and condense the oil vapor, and return it to the liquid phase for recovery, to prevent oil loss in vapor state from the oil supply.

The demister of the invention can be used in similar manner in the oil line from compressed air drills, air discharge cylinders, pneumatic air cylinders, or other compressed air supply tanks, in which the system is lubricated, and in which lubricating oil can enter the air used in operating the device. The demister in this case is put in series in the discharge line from the air cylinder, to remove the oil entrained in the air.

Having regard to the foregoing disclosure, the following is claimed as the inventive and patentable embodiments thereof:

1. A gas turbine gas demister and recycle system capable of removing substantially all of the oil entrained as droplets in such gases, before the gases are vented to the atmosphere, comprising, in combination, a gas turbine engine including, in series flow connection, a gas compressor, a gas combustor and a gas turbine; and a lubricant storage supply for the engine in fluid flow connection therewith by gas and lubricant supply lines leading to the engine, and a return line leading from the engine, and a gas vent line in fluid flow connection with the lubricant storage supply for venting gas conveyed thereto by the return line; and a demister assembly in series in the gas vent line for coalescing and stripping gas-entrained liquid lubricant droplets from gas in this line, returning coalesced liquid lubricant to the lubricant storage supply, the demister assembly comprising, in combination, in series fluid flow, a primary coalescer composite folded in a corrugated configuration and comprising a nonwoven fibrous mat confined between rigid porous facing sheets to a density within the range from about 0.05 to about 0.5 g/cc, the fibers being sufficiently long so that they form a coherent nonwoven mat, and having a diameter within the range from about 0.25 to about 30 microns, and a secondary coalescer comprising a porous open-cell polyurethane foam sheet having a porosity within the range from about 50 to about 150 pores per square inch, and having an average density within the range from about 1 to about 3 lbs/cu ft.

2. A gas turbine gas demister and recycle system in accordance with claim 1, in which the gas vent line beyond the demister is connected with the compressor, so that the oil vapor gas leaving the demister passes through the combustor and turbine, and any oil vapor therein is burned.

3. A gas turbine gas demister and recycle system in accordance with claim 1, in which the secondary coalescer is placed at an angle to the horizontal so that the coalesced liquid runs down the surface of the coalescer by gravity.

4. A gas turbine gas demister and recycle system in accordance with claim 1, in which the primary coalescer composite and secondary coalescer are each formed in a closed configuration, and arranged concentrically, one within the other.

5. A gas turbine gas demister and recycle system in accordance with claim 1, in which the primary coalescer fibrous mat is glass.

6. A gas turbine gas demister and recycle system in accordance with claim 1, in which the demister assembly comprises additional layers of primary coalescer composite and secondary coalescer which are capable also of sound attenuation, in addition to their coalescing and/or stripping function, so that when the fluid is caused to pass therethrough, noise level is also reduced.

* * * * *

UNITED STATES PATENT OFFICE
CERTIFICATE OF CORRECTION

Patent No. 4,050,237           Dated September 27, 1977

Inventor(s) David B. Pall et al

It is certified that error appears in the above-identified patent and that said Letters Patent are hereby corrected as shown below:

Column 5, line 50, "coalescene" should be --coalescence--.
Column 6, line 28, "cylinder" should be --cylindrical--.
           line 42, "8" should be --18--.
Column 7, line 22, "foam" should be --form--.
           line 25, "airline" should be --air line--.
Column 8, line 5, "remainer" should be --remainder--.

Signed and Sealed this

Thirteenth Day of June 1978

[SEAL]

Attest:

RUTH C. MASON
*Attesting Officer*

DONALD W. BANNER
*Commissioner of Patents and Trademarks*